(12) United States Patent
Bowman et al.

(10) Patent No.: US 7,580,769 B2
(45) Date of Patent: *Aug. 25, 2009

(54) TOOL OPERATOR INSTRUCTIONS SYSTEM AND METHOD

(75) Inventors: Andrew P. Bowman, Sumner, WA (US); Mark E. Van Horne, Bellevue, WA (US); Geoffrey M. Lindblad, Snohomish, WA (US); Milton O. Olson, Kirkland, WA (US); Craig A. Neidig, Issaquah, WA (US); Allan M. Hansen, Glencoe, MO (US); Ronald H. Eastman, Wichita, KS (US); Lynda L. Tuttle, Wichita, KS (US)

(73) Assignee: The Boeing Company, Chicago, IL (US)

( * ) Notice: Subject to any disclaimer, the term of this patent is extended or adjusted under 35 U.S.C. 154(b) by 1064 days.

This patent is subject to a terminal disclaimer.

(21) Appl. No.: 10/650,232

(22) Filed: Aug. 28, 2003

(65) Prior Publication Data

US 2005/0057490 A1 Mar. 17, 2005

(51) Int. Cl.
*G06F 19/00* (2006.01)

(52) U.S. Cl. ............................ 700/179; 700/95; 700/97; 700/105; 700/106; 700/107; 700/180; 700/182

(58) Field of Classification Search ................... 700/95, 700/117, 97, 105–107, 179–180, 182
See application file for complete search history.

(56) References Cited

U.S. PATENT DOCUMENTS

| | | | |
|---|---|---|---|
| 4,992,948 A | 2/1991 | Pilland et al. | |
| 5,249,135 A | 9/1993 | Fujita | |
| 5,771,043 A | 6/1998 | Nigawara et al. | |
| 5,774,361 A * | 6/1998 | Colarelli et al. | 701/29 |
| 5,793,638 A * | 8/1998 | Yao et al. | 700/226 |
| 5,822,207 A * | 10/1998 | Hazama et al. | 700/97 |
| 6,112,133 A | 8/2000 | Fishman | |

(Continued)

FOREIGN PATENT DOCUMENTS

EP 0 592 687 4/1994

(Continued)

OTHER PUBLICATIONS

Catia—Wikipedia, the free encyclopedia—5 pages.*

(Continued)

*Primary Examiner*—Ronald D Hartman, Jr.

(57) ABSTRACT

A system and method for providing tool operators in a manufacturing environment with clear and accurate tooling information increases tool operators' efficiency and reduces possibilities of errors. An output device and an input device are coupled to a processor. A tool operator enters a product option and a line number in the input device. The processor automatically selects a previously-defined build plan based on the entered information. The processor outputs the selected build plan to the output device. The outputted build plan includes tool information based on the entered product option and line number. The system communicates with a manufacturing system and a tool design system over a network. Build plans with product option and line number information are created at the manufacturing system, and the tool design system associates tools with the product option and line number information.

12 Claims, 7 Drawing Sheets

U.S. PATENT DOCUMENTS

| | | | |
|---|---|---|---|
| 6,188,402 B1* | 2/2001 | Csipkes et al. | 715/705 |
| 6,240,328 B1* | 5/2001 | LaLonde et al. | 700/95 |
| 6,453,209 B1* | 9/2002 | Hill et al. | 700/95 |
| 6,467,527 B1 | 10/2002 | Kubota et al. | |
| 6,477,437 B1* | 11/2002 | Hirota | 700/95 |
| 6,616,034 B2 | 9/2003 | Wu et al. | |
| 6,647,305 B1 | 11/2003 | Bigelow | |
| 6,749,029 B2 | 6/2004 | Alft et al. | |
| 6,937,920 B2* | 8/2005 | Nishio et al. | 700/165 |
| 6,990,383 B2* | 1/2006 | Hoppes et al. | 700/109 |
| 7,170,509 B2* | 1/2007 | Tanaka et al. | 345/419 |
| 7,203,703 B2* | 4/2007 | Clement et al. | 707/104.1 |
| 2002/0188910 A1 | 12/2002 | Zizzo | |
| 2003/0074424 A1* | 4/2003 | Giles et al. | 709/219 |
| 2003/0163219 A1* | 8/2003 | Flesher | 700/185 |
| 2004/0225390 A1* | 11/2004 | Keller et al. | 700/95 |
| 2005/0038541 A1* | 2/2005 | Clark et al. | 700/105 |
| 2007/0262984 A1* | 11/2007 | Pruss | 345/420 |

FOREIGN PATENT DOCUMENTS

GB    2 108 721    5/1983

OTHER PUBLICATIONS

Wikipedia's definition for the term "machining"; 5 pages; printed from WWW on Jul. 5, 2009.*

* cited by examiner

| | PLAN | |
|---|---|---|
| 202 → | OP 10 | IP 73456 TO BUILD UP PANEL |
| 204 → | OP 20 | RETRIEVE TOOL J73B |
| | | ATTACH 73W12-1PANEL TO MAIN ASSY (1_B_P1) PIN (8_A_P4) |
| 206 → | OP 30 | INSTALL STIFFENER LOCATOR (6_A_P2) |
| 208 → | OP 40 | INSTALL STIFFENER LOCATOR (7_A_P3) |
| 210 → | OP 50 | DRILL HOLE X, Y, V, Z WITH DRILL FEATURE (9_A) |

TOOL OPERATOR INSTRUCTIONS SYSTEM AND METHOD

FIELD OF THE INVENTION

This invention relates to manufacturing environments and, more particularly, to proper tooling within a manufacturing environment.

COPENDING APPLICATION

This invention is co-pending with U.S. application Ser. No. 10/650,598, filed concurrently herewith, which is hereby incorporated by reference.

BACKGROUND OF THE INVENTION

For many years, two-dimensional (2D) paper drawings were used for defining master product definitions. Communication among members of an Integrated Product Team and among teams was a challenge, especially for larger programs, because of the use of paper. For example, a design group would create 2D drawings for defining engineering assemblies. A manufacturing group used the 2D engineering drawings to understand intent of the design group, develop manufacturing assemblies and build plans, and communicate intent to a tooling group. The tooling group would create tools and tool instructions in order to comply with the build plan. In many cases, multiple variations of a tool were developed in order to comply with different product variations included in a build plan.

Tool operators receive the build plan from the manufacturing group and tooling information from the tooling group. Because the build plan was developed before tools were created or specified, the tool operators didn't know the specific tool version that was required by just reviewing the build plan. As a result, the tool operators spent time reviewing information provided by the tooling group in order to determine correct tool configuration for the product option and line number.

It would be desirable to provide tool operators with information regarding correct tool configuration for product option and line number. However, there exists an unmet need for clearly instructing tool operators.

SUMMARY OF THE INVENTION

The present invention is a system and method for providing tool operators in a manufacturing environment with clear and accurate tooling information, thereby increasing tool operators efficiency and reducing the possibilities of errors.

The system includes an output device and an input device that are coupled to a processor. A tool operator enters a product option and a line number in the input device, and a signal is generated based on the entered product information. The processor automatically selects a previously-defined build plan based on the generated signal. The processor outputs the selected build plan to the output device. The outputted build plan includes tool information based on the entered product option and line number.

In one aspect of the invention, the entered product information includes product option and line number information.

In another aspect of the invention, the processor communicates with a manufacturing system and a tool design system over a network. Build plans with product option and line number information are created at the manufacturing system, and the tool design system associates tools with the product option and line number information.

BRIEF DESCRIPTION OF THE DRAWINGS

The preferred and alternative embodiments of the present invention are described in detail below with reference to the following drawings.

DETAILED DESCRIPTION OF THE INVENTION

The present invention is a system and method for providing up to date and accurate manufacturing and tooling instructions to a tool operator who is executing a portion of an original or updated build plan.

Figure 1A:
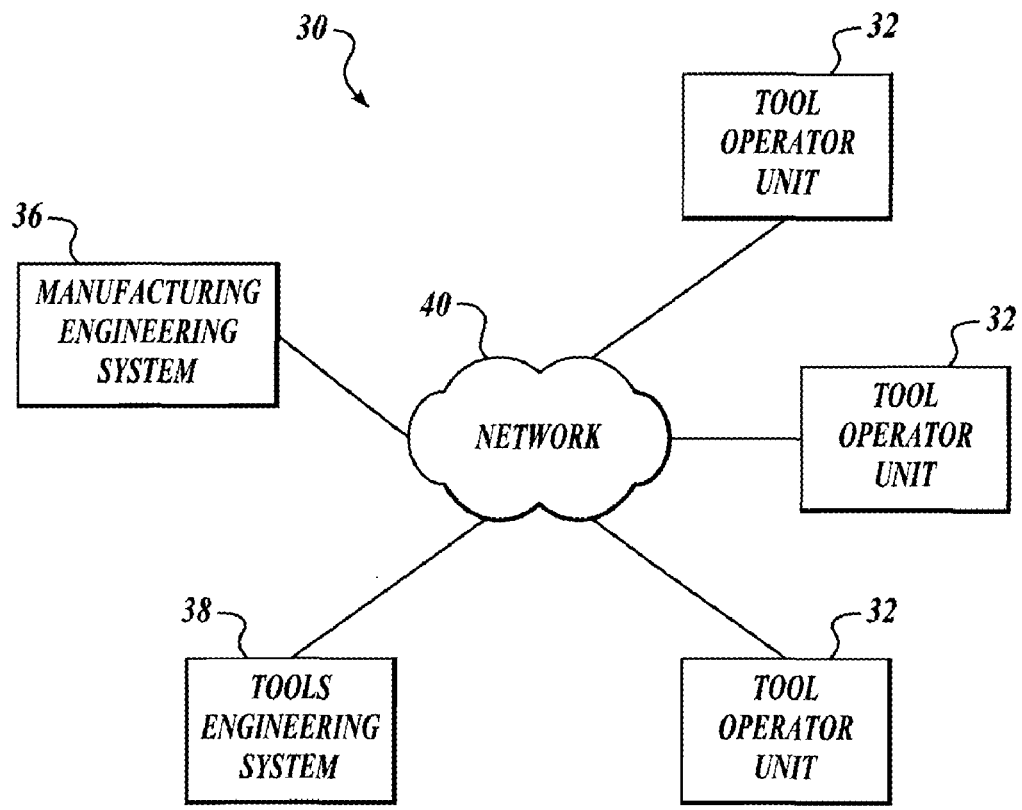
FIG. 1A is a block diagram of an example system formed in accordance with the present invention.

FIG. 1A illustrates an exemplary system 30 that includes components for enabling a tool operator to quickly and effectively access specific tool information as it relates to a build plan. The system 30 includes multiple tool operator units 32, a manufacturing engineering system 36, and a tool engineering system 38 that are all connected to a public or private data network 40. The components of the system 30 are various computer-based user interface products, such as without limitation a personal computer with computer-aided design capabilities, that allow input, edits or review of a build plan in a manufacturing environment. The manufacturing engineering system 36 allows a manufacturing engineer to develop a build plan or an alteration to a build plan. The tool engineering system 38 allows tools engineers to design tools in order to carry out the generated build plan. The tool operator units 32 allow tool operators to deal with build plan instructions that include specific tool information for properly executing the build plan.

It will be appreciated that each of the components of the system 30 can be distributed across the network 40 and can be in wired or wireless communication with the network 40.

Figure 1B:
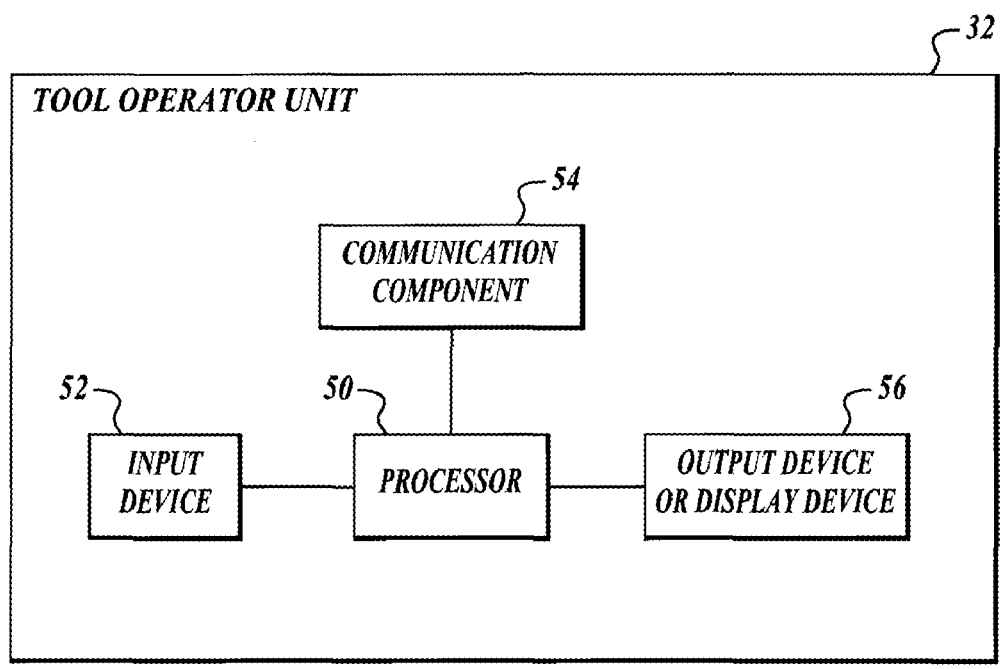
FIG. 1B is a block diagram of a tool operator unit from in FIG. 1A.

FIG. 1B illustrates exemplary components for a tool operator unit 32. The tool operator unit 32 includes a processor 50 that is coupled to a user interface 52, a communication component 54, and an output device 56. Examples of the user interface 52 are a keyboard or mouse that interacts with a graphical user interface generated by the processor 50 and presented on the output device 56, such as a display device. The communication component 54 sends and receives information across the network 40.

Figure 2:
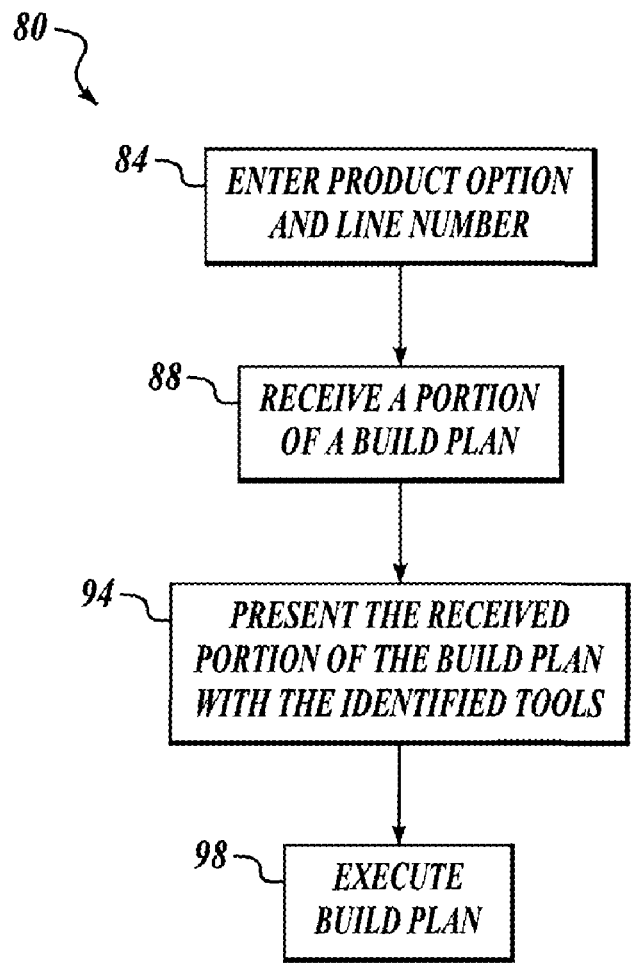
FIG. 2 is a flow diagram of an example process performed by the system shown in FIG. 1A.

FIG. 2 illustrates an exemplary process 80 for providing tool operators with information for properly and efficiently performing their job function. At a block 84, a tool operator enters an available product option and product line number information into the tool operator unit 32 using an associated user interface 52. At a block 88, the tool operator unit 32 receives a portion of a build plan based on the entered product option and line number from the manufacturing engineering system 36 or the tool engineering system 38 via the communication component 54. The received build plan identifies the desired tool and proper variation of the tool for producing the entered product option. It will be appreciated that the build plan is created in a software application program, such as without limitation CATIA V5, that has been altered to allow association of specific tool versions with build plan actions. A software application program of this type is described in co-pending U.S. application Ser. No. 10/650,598, filed concurrently herewith, which is hereby incorporated by reference.

At a block 94, the received portion of the build plan, along with the identified tool information is presented to the operator over an output device 56, such as without limitation a display, of the tool operator unit 32. At a block 98, the tool operator executes the build plan as presented. Because the tool operator advantageously is presented with specific tool information as it relates to the product option and the line number associated with the product option, according to the present invention the tool operator does not need to perform any research in order to determine the proper tool or, more specifically, the proper variation of a tool to use.

Figure 3:
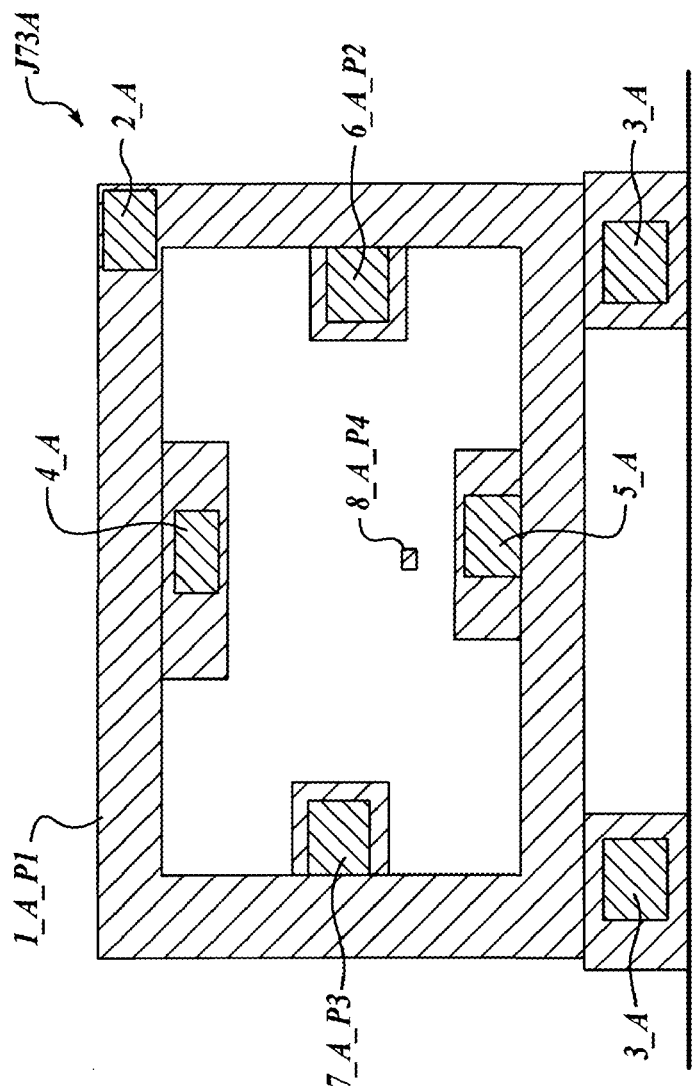
FIG. 3 is an abstract view of a tool used for a product option and line numbers.

FIG. 3 illustrates a graphical representation of an example tool J73A that is used by a tool operator to perform drilling of holes for a hinge in a cargo door panel of an aircraft (not shown). The tool J73A is identified as version A of tool J73. The tool J73A includes four major parts: main assembly 1_A_P1; a right stiffener locator 6_A_P2; a left stiffener locator 7_A_P3; and a pin 8_A_P4. The main assembly 1_A_P1 includes: a frame 2_A; two instances of base 3_A; a fixed locator 4_A; and a drill feature 5_A.

Figure 4:
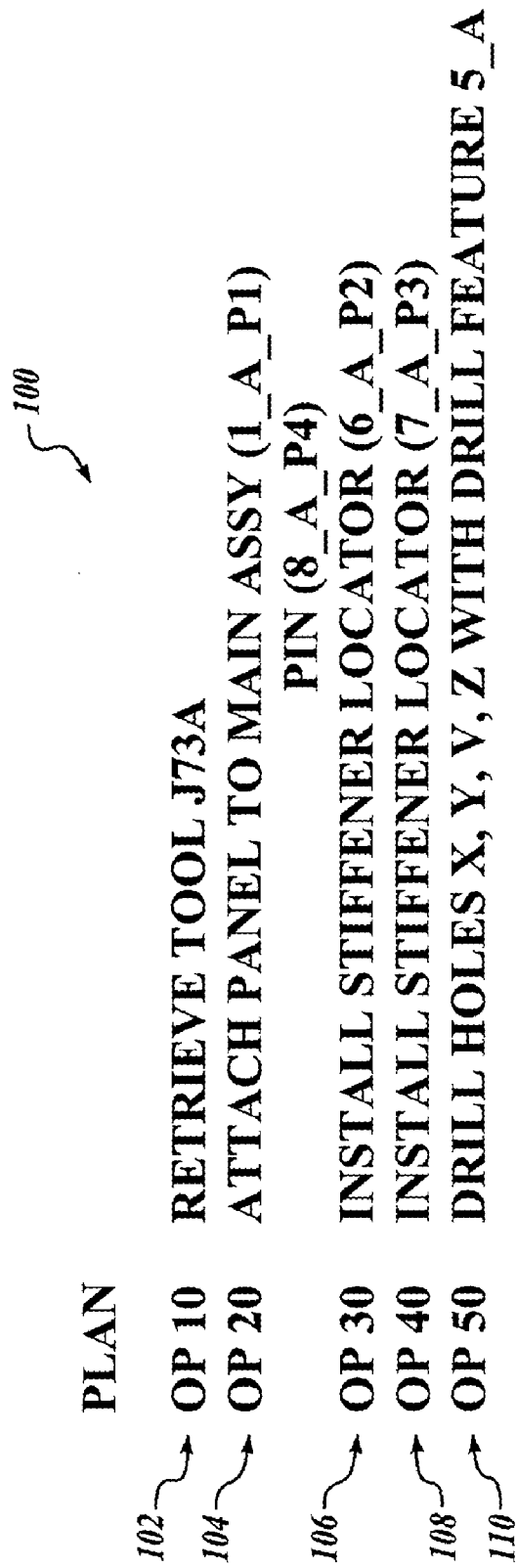
FIG. 4 is a build plan received by a tool operator based on the tool shown in FIG. 3.

FIG. 4 illustrates a portion of a build plan 100 that instructs an operator of the tool J73A to drill holes in the cargo door panel. At an instruction 102 of the build plan, the portion of the build plan 100 instructs the tool operator to retrieve tool J73, version A. At a instruction 104 of the build plan 100, the operator is instructed to attach the cargo door panel to the main assembly 1_A_P1 using the pin 8_A_P4. At a instruction 106, the build plan 100 instructs the operator to install the stiffening locator 6_A_P2. At a instruction 108, the build plan 100 instructs the operator to install stiffening locator 7_A_P3. At a instruction 110, the operator is instructed to drill holes x, y, v, and z with the drill feature 5_A of the main assembly 1_A_P1.

In the example above, in-service experience of the cargo door panel generated by the tool J73A indicates that a hinge that is attached to the cargo door panel at the holes that were drilled by the drill feature 5_A of the main assembly 1_A_P1 of the tool J73A may fail prematurely. Further, aircraft engineers determine that a different bolt pattern for the hinge on the cargo door panel will fix the problem. Accordingly, change order for the same cargo door panel option starting at product line 5 is generated by a manufacturing engineer using the manufacturing engineering system 36. The change order is sent to the tool engineering system 38 in order to change the tool J73A to drill the designated new hole pattern. In this example, a tool engineer determines that tool J73A cannot be used to drill the new pattern. The tool engineer designs a new tool detail, i.e. drill feature, that is then fabricated and designated as tool J73B. The manufacturing engineers do not need to change the build plan because the general instruction to drill holes stays the same. The only thing that changes in this example is the tool version. Instead of using tool J73A, the changed tool J73B is used for the product line 5 and greater.

Figure 5:
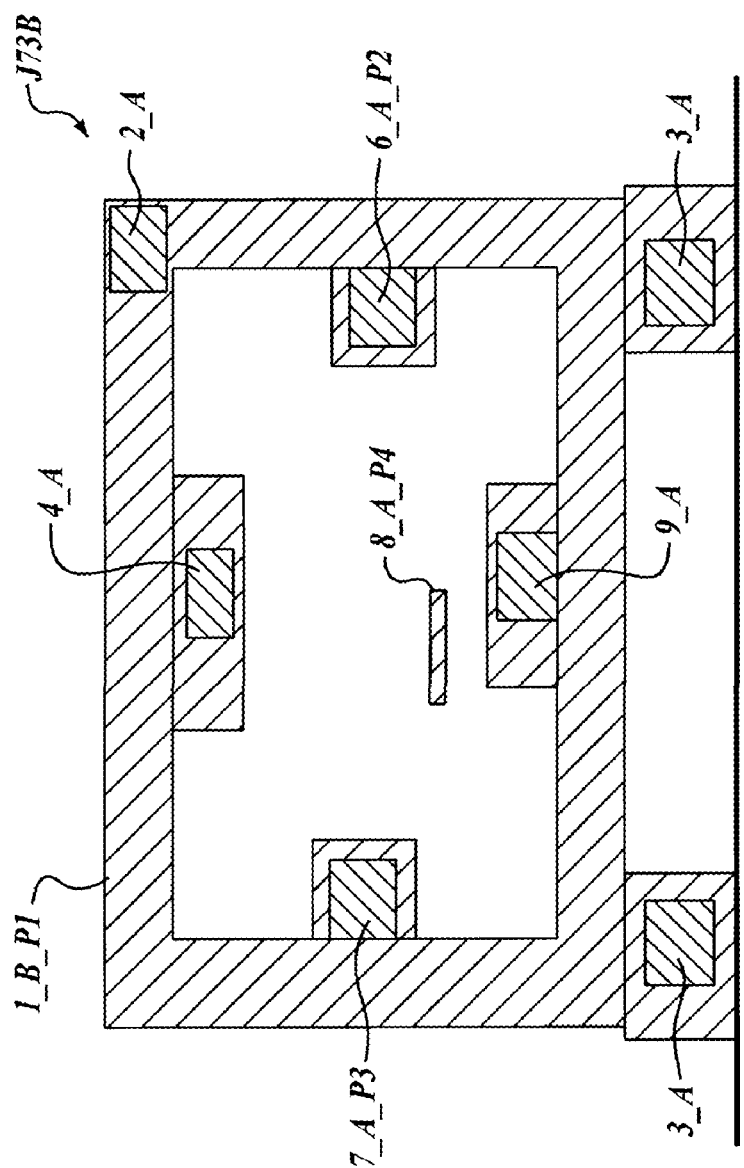
FIG. 5 is an abstract view of a different version of the tool shown in FIG. 3 that is used for a different product option and line number.

FIG. 5 illustrates the reworked tool J73B. The only feature that changed from the tool J73A to the new tool J73B is that the hole drill feature 5_A is replaced with a new drill feature 9_A. The new drill feature 9_A was designed in order to drill holes according to the new drill pattern. Because a subcomponent of the main assembly has changed, the main assembly is now given a new version number 1_B_P1.

Figure 6:
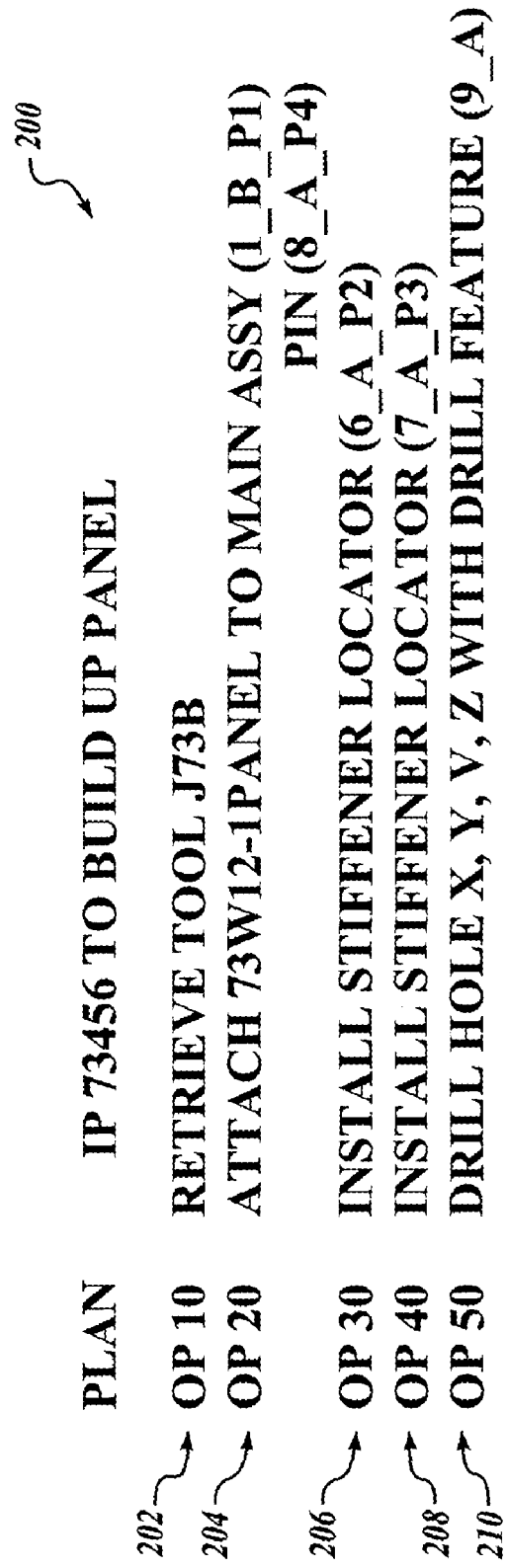
FIG. 6 is a build plan that uses the tool shown in FIG. 5.

FIG. 6 illustrates a build plan 200 for producing a cargo door panel option A, that is the same option as that requested at the build plan 100, at product line 7. Because the tool operator is to build option A, product line 7, the build plan 200 is used. The instructions in build plan 200 are substantially the same as that for the build plan 100 (FIG. 4), except at a instruction 202 the operator is instructed to retrieve the tool J73B; at a instruction 204, the main assembly 1_B_P1 is called out; and the drill feature 9_A is called out at a instruction 210.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to that claims that follow.

What is claimed is:

1. A system for presenting a build plan of a product to a tool operator, the system comprising:
    a first means for selecting a build plan in response to entered product information, the build plan including tool information about tools for performing machining operations on the product, at east some of the tools having different versions for performing the same machining operation, the build plan also selecting tool versions for those tools having different versions, whereby the tool operator does not have to perform research in order to make proper tool selections; and
    second means for outputting the selected build plan to the tool operator.

2. The system of claim 1, wherein the entered product information includes a product line number of the product and information identifying configuration of the product.

3. The system of claim 2, wherein the second means communicates with a manufacturing system and a tool design system over a network, wherein the manufacturing system enables creation of a build plan based on the product line number of the product and information identifying configuration of the product, and the tool design system enables association of tools with the build plans based on the product line number of the product and information identifying configuration of the product.

4. The system of claim 1, wherein the first means automatically selects the build plan.

5. The system of claim 1, wherein the first means includes a manufacturing component and a tool design component, wherein the manufacturing component enables creation of a build plan based on the product line number of the product and information identifying configuration of the product and the tool design component enables association of tools with the build plans based on the product line number of the product and information identifying configuration of the product.

6. A method for outputting a build plan to a tool operator at an operator computer system, the method comprising:
    receiving product information about a product, the information received from the operator computer system;
    selecting a build plan based on the received product information, wherein the build plan includes tool information about a tool for performing a machining operation on the product, the tool having different versions for performing the same machining operation, the build plan also selecting a tool version so the tool operator does not have to perform research in order to make the selection; and outputting the selected build plan to the operator computer system.

7. The method of claim 6, wherein the received product information includes a product line number of the product and information identifying configuration of the product.

8. The method of claim 7, wherein selecting the build plan includes communicating with a manufacturing system and a tool design system.

9. The method of claim 7, wherein selecting is performed automatically.

10. A method for outputting a build plan to a machine tool operator at an operator computer system, the method comprising:

entering a product line number of a product and information identifying configuration of the product at an input device of the operator computer system;

automatically receiving a build plan from a manufacturing system over a network connection, the build plan based on the entered product line number of the product and information identifying configuration of the product; and outputting the received build plan to the operator computer system, wherein the outputted build plan includes information about tools for performing machining operations on the product, at least some of the tools having different versions for performing the same machining operation, the build plan also selecting tool versions for those tools having different versions, whereby the tool operator does not have to perform research in order to make proper tool selections.

11. The method of claim 10, wherein the tool information includes tool component information.

12. The method of claim 11, wherein the tool component information includes tool component version information.

* * * * *

UNITED STATES PATENT AND TRADEMARK OFFICE
CERTIFICATE OF CORRECTION

PATENT NO. : 7,580,769 B2
APPLICATION NO. : 10/650232
DATED : August 25, 2009
INVENTOR(S) : Bowman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1645 days.

Signed and Sealed this

Fourteenth Day of September, 2010

David J. Kappos
*Director of the United States Patent and Trademark Office*